(12) United States Patent
Cui

(10) Patent No.: US 11,144,201 B2
(45) Date of Patent: Oct. 12, 2021

(54) VIDEO PICTURE ADJUSTMENT METHOD AND APPARATUS, COMPUTER DEVICE AND STORAGE MEDIUM

(71) Applicant: BEIJING MICROLIVE VISION TECHNOLOGY CO., LTD., Beijing (CN)

(72) Inventor: Hao Cui, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/018,212

(22) Filed: Sep. 11, 2020

(65) Prior Publication Data

US 2020/0409550 A1 Dec. 31, 2020

Related U.S. Application Data

(63) Continuation of application No. PCT/CN2019/116204, filed on Nov. 7, 2019.

(30) Foreign Application Priority Data

Nov. 8, 2018 (CN) .......................... 201811324662.9

(51) Int. Cl.
*G06F 3/048* (2013.01)
*G06F 3/0488* (2013.01)
*G06F 3/0481* (2013.01)

(52) U.S. Cl.
CPC ........ *G06F 3/04886* (2013.01); *G06F 3/0481* (2013.01); *G06F 3/04883* (2013.01); *G06F 2203/04803* (2013.01)

(58) Field of Classification Search
CPC ... H04L 51/22; G06F 3/0484; G06F 3/04886; G06F 3/0481; G06F 2203/04803;
(Continued)

(56) References Cited

U.S. PATENT DOCUMENTS 5,363,143 A * 11/1994 Duffield ............... H04N 7/0122
348/564
5,434,625 A * 7/1995 Willis .................... H04N 3/223
348/564
(Continued)

FOREIGN PATENT DOCUMENTS

CN 1805537 A 7/2006
CN 101609387 A 12/2009
(Continued)

OTHER PUBLICATIONS

International Search Report and Written Opinion dated Feb. 1, 2020 for PCT Patent Application PCT/CN2019/116204.
(Continued)

*Primary Examiner* — Steven B Theriault
(74) *Attorney, Agent, or Firm* — Thomas | Horstemeyer LLP

(57) ABSTRACT

Provided are a video picture adjustment method and apparatus, a computer device and a storage medium. The method includes the following steps: a first height-width ratio of a picture of a reference video is compared with a preset height-width ratio to obtain a first comparison result, where a human-eye comfort parameter corresponding to the preset height-width ratio meets a preset condition; and a picture size of the reference video is adjusted according to a picture size of the recorded video and the first comparison result, where the reference video and the recorded video are two views displayed on a display screen in a split-screen manner.

16 Claims, 11 Drawing Sheets

(58) Field of Classification Search
CPC .......... H04N 21/4532; H04N 21/2187; H04N 7/183; H04N 21/8549; H04N 21/44008; H04N 21/23418; H04N 21/4345; H04N 7/181; H04N 21/2343; H04N 21/2665; H04N 21/4402; H04N 21/4314; H04N 21/472; H04N 5/2628; H04N 21/4312; H04N 21/440263; H04N 21/47205
See application file for complete search history.

(56) References Cited

U.S. PATENT DOCUMENTS

| | | | | |
|---|---|---|---|---|
| 5,680,177 | A * | 10/1997 | Abe | H04N 5/45 348/564 |
| 5,682,326 | A * | 10/1997 | Klingler | G11B 27/034 715/202 |
| 6,081,264 | A * | 6/2000 | Rosen | H04N 5/765 348/700 |
| 6,317,164 | B1 * | 11/2001 | Hrusecky | H04N 21/4622 348/581 |
| 6,791,578 | B1 * | 9/2004 | Ubillos | G09G 5/391 348/E5.111 |
| 7,068,291 | B1 * | 6/2006 | Roberts | G06F 3/14 345/635 |
| 7,113,200 | B2 * | 9/2006 | Eshkoli | H04N 7/147 348/14.07 |
| 7,268,830 | B2 * | 9/2007 | Lee | G06F 3/0481 348/565 |
| 7,292,284 | B2 * | 11/2007 | Kim | H04N 5/44591 348/564 |
| 7,339,627 | B2 * | 3/2008 | Schoner | H04N 5/142 348/556 |
| 7,375,768 | B2 * | 5/2008 | Herberger | G11B 27/034 348/584 |
| 7,420,620 | B2 * | 9/2008 | Habas | H04N 5/45 348/565 |
| 7,616,264 | B1 * | 11/2009 | Greenberg | H04N 5/445 348/564 |
| 7,623,187 | B2 * | 11/2009 | Morishige | H04N 7/0122 348/556 |
| 7,746,384 | B2 * | 6/2010 | Saitou | H04N 19/40 348/222.1 |
| 7,802,288 | B2 * | 9/2010 | Sie | H04N 7/163 725/116 |
| 7,830,401 | B2 * | 11/2010 | Sonobe | G09G 5/00 345/699 |
| 7,936,398 | B2 * | 5/2011 | Kosugi | H04N 21/443 348/445 |
| 7,944,507 | B2 * | 5/2011 | Kudo | H04N 5/46 348/581 |
| 7,957,625 | B2 * | 6/2011 | Mae | H04N 9/7921 386/326 |
| 8,120,706 | B1 * | 2/2012 | Verbeck | H04N 5/44 348/556 |
| 8,249,252 | B2 * | 8/2012 | Sakuma | H04N 21/2541 380/203 |
| 8,279,299 | B2 * | 10/2012 | Fukuyama | H04N 9/7921 348/220.1 |
| 8,300,134 | B2 * | 10/2012 | Suzuki | G09G 5/00 348/333.02 |
| 8,310,408 | B1 * | 11/2012 | Walker | G06F 3/1423 345/3.3 |
| 8,319,891 | B2 * | 11/2012 | Umei | H04N 19/59 348/445 |
| 8,423,903 | B2 * | 4/2013 | Pearce | H04N 5/44 715/799 |
| 8,456,571 | B1 * | 6/2013 | Taylor | H04N 7/0122 348/445 |
| 8,502,919 | B2 * | 8/2013 | Kimura | H04N 7/0117 348/537 |
| 8,587,653 | B1 * | 11/2013 | Vidunas | H04N 5/247 348/143 |
| 8,625,663 | B2 * | 1/2014 | Sayre | H04N 21/2383 375/240.01 |
| 8,717,390 | B2 * | 5/2014 | Gross | G06T 3/0012 345/648 |
| 8,736,755 | B2 * | 5/2014 | Yang | H04N 5/45 348/441 |
| 8,917,329 | B1 * | 12/2014 | Woodman | G06T 3/0093 348/222.1 |
| 8,934,024 | B2 * | 1/2015 | Carter | H04N 21/4126 348/222.1 |
| 8,947,491 | B2 * | 2/2015 | Rosenberg | H04N 7/147 348/14.03 |
| 9,118,888 | B1 * | 8/2015 | Hundemer | G11B 27/034 |
| 9,142,052 | B1 * | 9/2015 | Caine | G06T 3/40 |
| 9,208,819 | B1 * | 12/2015 | Gregg | H04N 5/781 |
| 9,218,792 | B2 * | 12/2015 | Dutta | G06T 1/00 |
| 9,294,710 | B2 * | 3/2016 | Lim | H04N 5/76 |
| 9,418,283 | B1 * | 8/2016 | Natarajan | G06K 9/00463 |
| 9,485,455 | B2 * | 11/2016 | Cho | H04N 7/0122 |
| 9,570,036 | B2 * | 2/2017 | Lei | G09G 5/00 |
| 9,706,162 | B2 * | 7/2017 | Belisomi | H04N 7/0122 |
| 9,747,863 | B2 * | 8/2017 | Nicolas | G09G 5/005 |
| 9,756,282 | B2 * | 9/2017 | McCoy | H04N 7/0122 |
| 10,120,635 | B2 * | 11/2018 | Yoganandan | G06F 3/0482 |
| 10,154,429 | B1 * | 12/2018 | Sharoni | G06F 11/3438 |
| 10,163,190 | B2 * | 12/2018 | Lu | H04N 19/70 |
| 10,200,597 | B2 * | 2/2019 | Choi | H04N 5/23293 |
| 10,586,513 | B2 * | 3/2020 | Scheepens | H04N 21/4316 |
| 10,917,608 | B1 * | 2/2021 | Faulkner | H04N 7/155 |
| 2002/0089523 | A1 * | 7/2002 | Hodgkinson | H04N 5/44504 345/660 |
| 2004/0114049 | A1 * | 6/2004 | Arora | H04N 7/0122 348/445 |
| 2005/0019015 | A1 * | 1/2005 | Ackley | H04N 21/4314 386/201 |
| 2005/0094034 | A1 * | 5/2005 | Bhatia | H04N 19/61 348/581 |
| 2005/0117121 | A1 * | 6/2005 | Meerleer | G06F 3/1446 353/30 |
| 2005/0157948 | A1 * | 7/2005 | Lee | H04N 21/440272 382/299 |
| 2005/0169608 | A1 * | 8/2005 | Shen | H04N 9/8227 386/230 |
| 2005/0179817 | A1 * | 8/2005 | Kida | G06T 3/40 348/556 |
| 2005/0180858 | A1 * | 8/2005 | Halgas, Jr. | H04N 21/440272 417/53 |
| 2006/0092324 | A1 * | 5/2006 | Morishige | H04N 7/0122 348/556 |
| 2006/0171336 | A1 * | 8/2006 | MacDonald | H04N 7/152 370/260 |
| 2006/0188173 | A1 * | 8/2006 | Zhang | H04N 7/0122 382/276 |
| 2006/0197870 | A1 * | 9/2006 | Habas | H04N 5/45 348/565 |
| 2007/0097110 | A1 * | 5/2007 | Inui | H04N 21/443 345/418 |
| 2007/0139400 | A1 * | 6/2007 | Neuman | H04N 7/0122 345/204 |
| 2007/0139425 | A1 * | 6/2007 | Neuman | H04N 21/4122 345/520 |
| 2007/0139559 | A1 * | 6/2007 | Neuman | H04N 21/4402 348/581 |
| 2007/0204302 | A1 | 8/2007 | Calzone | |
| 2007/0258010 | A1 | 11/2007 | Hong et al. | |
| 2008/0100642 | A1 * | 5/2008 | Betancourt | G06F 3/04845 345/663 |
| 2008/0316361 | A1 * | 12/2008 | Ito | H04N 7/01 348/572 |
| 2009/0041429 | A1 * | 2/2009 | Mae | H04N 9/7921 386/304 |
| 2009/0115894 | A1 * | 5/2009 | Lin | H04N 21/4621 348/445 |
| 2010/0002138 | A1 * | 1/2010 | Chen | G06F 3/0481 348/564 |
| 2010/0053441 | A1 * | 3/2010 | Tokashiki | H04N 5/208 348/576 |

(56) References Cited

U.S. PATENT DOCUMENTS

| | | | | |
|---|---|---|---|---|
| 2010/0053442 | A1* | 3/2010 | Kudo | H04N 21/47 348/581 |
| 2010/0097488 | A1* | 4/2010 | Suzuki | G09G 5/00 348/222.1 |
| 2010/0110294 | A1* | 5/2010 | Oka | H04N 21/4113 348/564 |
| 2010/0149216 | A1* | 6/2010 | Dutta | G06T 1/00 345/660 |
| 2010/0253836 | A1* | 10/2010 | Huang | G09G 5/391 348/441 |
| 2010/0299627 | A1* | 11/2010 | Kenagy | H04N 21/4858 715/800 |
| 2011/0013079 | A1* | 1/2011 | Howarter | H04N 7/0122 348/445 |
| 2011/0058100 | A1* | 3/2011 | Muto | H04N 7/0122 348/445 |
| 2011/0126104 | A1* | 5/2011 | Woods | H04N 21/440218 715/719 |
| 2011/0304713 | A1* | 12/2011 | Tardif | G06F 3/1423 348/54 |
| 2012/0124474 | A1* | 5/2012 | Suh | H04N 21/4854 715/717 |
| 2012/0176471 | A1* | 7/2012 | Cheng | H04N 13/261 348/43 |
| 2012/0281062 | A1* | 11/2012 | Gu | H04N 21/44209 348/14.12 |
| 2013/0004141 | A1* | 1/2013 | Wu | G06F 16/78 386/241 |
| 2013/0010058 | A1* | 1/2013 | Pomeroy | H04N 13/161 348/43 |
| 2013/0051767 | A1* | 2/2013 | Soroushian | H04N 21/23439 386/248 |
| 2013/0067331 | A1* | 3/2013 | Glazer | H04L 65/607 715/719 |
| 2013/0077684 | A1* | 3/2013 | Chen | H04N 19/70 375/240.13 |
| 2013/0271661 | A1* | 10/2013 | Kimura | G09G 3/3674 348/564 |
| 2014/0208262 | A1* | 7/2014 | Huang | G06F 3/0481 715/800 |
| 2014/0348246 | A1* | 11/2014 | Fu | H04N 19/115 375/240.26 |
| 2014/0351721 | A1* | 11/2014 | DeLuca | G06F 3/1423 715/760 |
| 2014/0354871 | A1* | 12/2014 | Hikida | H04N 5/23296 348/333.12 |
| 2015/0103138 | A1* | 4/2015 | Lin | H04N 7/0117 348/14.12 |
| 2015/0109436 | A1* | 4/2015 | Chen | H04N 19/70 348/143 |
| 2015/0138040 | A1* | 5/2015 | Teramae | G06F 3/1446 345/1.3 |
| 2015/0146879 | A1* | 5/2015 | Nguyen | H04N 21/43615 381/74 |
| 2015/0255044 | A1* | 9/2015 | Hirasawa | H04N 5/44504 348/569 |
| 2015/0294640 | A1* | 10/2015 | Lei | H04N 5/14 348/445 |
| 2015/0296175 | A1* | 10/2015 | Wallace | G09G 5/005 348/445 |
| 2015/0302551 | A1* | 10/2015 | Huang | G06T 3/4023 382/199 |
| 2015/0341686 | A1* | 11/2015 | Wen | H04N 21/4113 725/109 |
| 2016/0261923 | A1* | 9/2016 | Huang | G06T 3/40 |
| 2016/0269777 | A1* | 9/2016 | Yu | H04N 21/472 |
| 2016/0381306 | A1* | 12/2016 | Yang | G11B 27/031 386/280 |
| 2017/0025038 | A1* | 1/2017 | Oguchi | G09B 19/0038 |
| 2017/0025039 | A1* | 1/2017 | Oguchi | H04N 21/8547 |
| 2017/0132755 | A1* | 5/2017 | Lu | G06F 3/04842 |
| 2017/0177096 | A1* | 6/2017 | Cheong | G06F 3/048 |
| 2017/0180746 | A1* | 6/2017 | Li | H04N 19/179 |
| 2017/0195614 | A1* | 7/2017 | Zan | H04N 21/47 |
| 2017/0256288 | A1* | 9/2017 | Ai | G11B 27/34 |
| 2018/0176468 | A1* | 6/2018 | Wang | H04N 5/23238 |
| 2018/0196596 | A1* | 7/2018 | Choi | G06F 3/147 |
| 2018/0316941 | A1* | 11/2018 | Todd | H04N 21/4438 |
| 2019/0073747 | A1* | 3/2019 | Burch | G06T 3/4092 |
| 2019/0333479 | A1* | 10/2019 | Maalouf | G09G 5/38 |

FOREIGN PATENT DOCUMENTS

| | | |
|---|---|---|
| CN | 102307318 A | 1/2012 |
| CN | 102890816 A | 1/2013 |
| CN | 103780864 A | 5/2014 |
| CN | 105165017 A | 12/2015 |
| CN | 105611390 A | 5/2016 |
| CN | 106454256 A | 2/2017 |
| CN | 106604047 A | 4/2017 |
| CN | 106662965 A | 5/2017 |
| CN | 108737882 A | 11/2018 |
| CN | 108769561 A | 11/2018 |
| CN | 109348276 A | 2/2019 |
| TW | 200701792 A | 1/2007 |

OTHER PUBLICATIONS

1st Search Report dated May 16, 2019 for Chinese Patent Application No. 201811324662.9.
1st Office Action dated May 22, 2019 for Chinese Patent Application No. 201811324662.9.
Supplementary Search dated Jul. 20, 2019 for Chinese Patent Application No. 201811324662.9.

* cited by examiner

VIDEO PICTURE ADJUSTMENT METHOD AND APPARATUS, COMPUTER DEVICE AND STORAGE MEDIUM

CROSS-REFERENCE TO RELATED APPLICATIONS

This is continuation of International Patent Application No. PCT/CN2019/116204, filed on Nov. 7, 2019, which is based on and claims priority to Chinese Patent Application No. 201811324662.9 filed with the CNIPA on Nov. 8, 2018, disclosures of which are incorporated herein by reference in their entireties.

TECHNICAL FIELD

The present disclosure relates to the field of video technologies and, for example, to a video picture adjustment method and apparatus, a computer device and a storage medium.

BACKGROUND

With the development of a network technology and a multimedia technology, playing or recording a video by using a mobile terminal device has become one of important applications of the multimedia technology.

In some cases, a user has a requirement of recording a video on a screen and at the same time playing a reference video that the user is interested in on the same screen. However, the displayed reference video and the displayed recorded video may have discordant proportions since a recording device or a recording manner of the reference video and the recorded video may be different.

SUMMARY

Embodiments of the present disclosure provide a video picture adjustment method and apparatus, a computer device and a storage medium, which enable a display effect of a synthesized video recorded in a split-screen manner to be better.

In an embodiment, an embodiment of the present disclosure provides a video picture adjustment method. The method includes the following steps: a first height-width ratio of a picture of a reference video is compared with a preset height-width ratio to obtain a first comparison result, where a human-eye comfort parameter corresponding to the preset height-width ratio is optimal; and a picture size of the reference video is adjusted according to a picture size of a recorded video and the first comparison result, where the reference video and the recorded video are two views displayed on a current display screen in a split-screen manner.

In an embodiment, an embodiment of the present disclosure provides a video picture adjustment apparatus. The apparatus includes a first comparison module and a video picture adjustment module. The first comparison module is configured to compare a first height-width ratio of a picture of a reference video with a preset height-width ratio to obtain a first comparison result, where a human-eye comfort parameter corresponding to the preset height-width ratio is optimal. The video picture adjustment module is configured to adjust a picture size of the reference video according to a picture size of a recorded video and the first comparison result, where the reference video and the recorded video are two views displayed on a current display screen in a split-screen manner.

In an embodiment, an embodiment of the present disclosure provides a computer device. The computer device includes a memory and a processor. The memory stores computer programs, and the processor, when executing the computer programs, implements the following steps: a first height-width ratio of a picture of a reference video is compared with a preset height-width ratio to obtain a first comparison result, where a human-eye comfort parameter corresponding to the preset height-width ratio is optimal; and a picture size of the reference video is adjusted according to a picture size of a recorded video and the first comparison result, where the reference video and the recorded video are two views displayed on a current display screen in a split-screen manner.

In an embodiment, an embodiment of the present disclosure provides a computer-readable storage medium. Computer programs are stored in the computer-readable storage medium. The computer programs, when executed by a processor, implement the following steps: a first height-width ratio of a picture of a reference video is compared with a preset height-width ratio to obtain a first comparison result, where a human-eye comfort parameter corresponding to the preset height-width ratio is optimal; and a picture size of the reference video is adjusted according to a picture size of a recorded video and the first comparison result, where the reference video and the recorded video are two views displayed on a current display screen in a split-screen manner.

DETAILED DESCRIPTION

The present disclosure will be described in detail below with reference to the drawings and embodiments. The specific embodiments described herein are merely intended to illustrate the present disclosure and are not intended to limit the present disclosure.

A video generation method provided in an embodiment of the present disclosure may be applied to multiple types of terminal devices which may be, but is not limited to, various personal computers, a laptop, a smart phone, a tablet computer and a portable wearable device.

Figure 1:
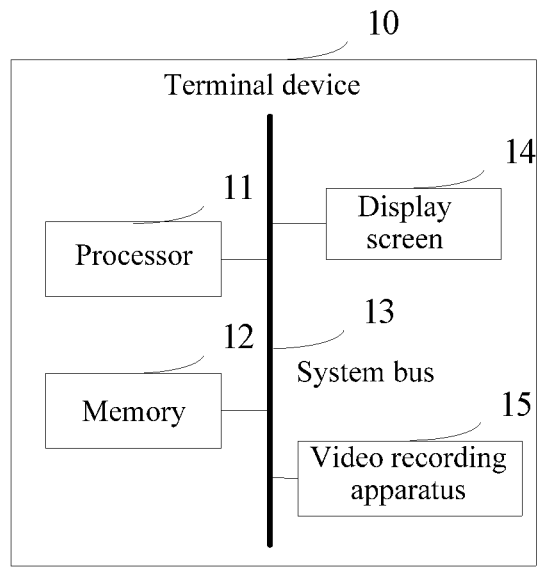
FIG. 1 is a diagram of an application environment of a video picture adjustment method according to an embodiment.

As shown in FIG. 1, a terminal device 10 may include a processor 11, a memory 12, a system bus 13, a display screen 14 and a video recording apparatus 15. The processor 11, the memory 12, the display screen 14 and the video recording apparatus 15 may be connected via the system bus 13. The memory 12 may include a non-volatile storage medium and/or a volatile storage medium, and may store computer programs. The processor 11, when executing the computer programs, may implement a video picture adjustment method provided by an embodiment of the present disclosure. The display screen 14 may be a liquid crystal screen or an electronic ink screen, and configured to display a recorded video and a reference video. The video recording apparatus 15 may be a camera or the like and is configured to record a video. The terminal device 10 may also support various applications, such as an application used for recording in a split-screen manner.

Those skilled in the art may understand that the structure shown in FIG. 1 is merely a block diagram of a part of the structures related to a scheme of the present disclosure, and does not constitute a limitation on the above-mentioned terminal device to which the scheme of the present disclosure is applied. An actual terminal device may include more or less components than those shown in the drawings, or may include a combination of some components, or have different component arrangements.

Figure 2:
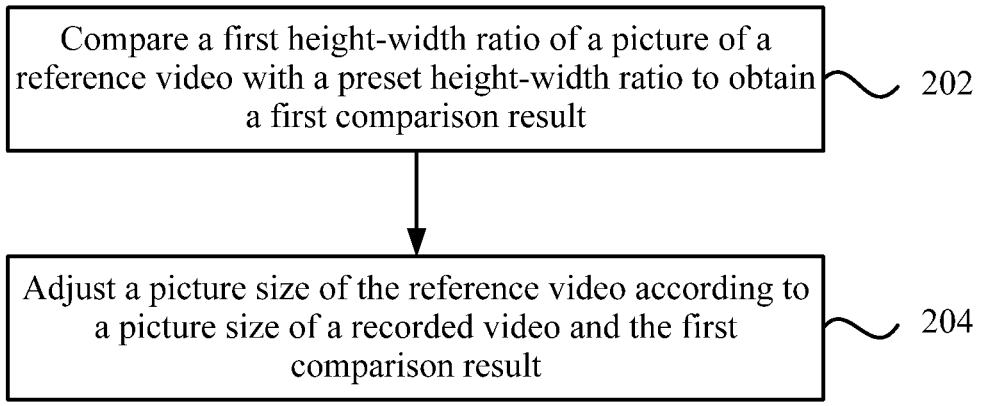
FIG. 2 is a flowchart of a video image adjustment method according to an embodiment.

In an embodiment, as shown in FIG. 2, a video picture adjustment method is provided. Taking the method applied to the terminal device in FIG. 1 as an example for illustration, the method may include steps described below.

In step 202, a first height-width ratio of a picture of a reference video is compared with a preset height-width ratio to obtain a first comparison result.

The above-mentioned reference video is a complete video stored in the terminal device, and may be a pre-stored video, a pre-recorded video or a video downloaded through a network, etc. A human-eye comfort parameter corresponding to the preset height-width ratio meets a preset condition. The preset condition may be understood as that the human-eye comfort parameter corresponding to the preset height-width ratio is optimal. In an embodiment, the optimal human-eye comfort parameter may be understood as the highest comfort level to which the human-eye comfort parameter belongs, that is, different height-width ratios of the picture of the video may correspond to different human-eye comfort parameters. For example, the preset height-width ratio may be obtained by counting watching ratings of users for a large number of synthesized videos recorded in the split-screen manner. The synthesized video recorded in the split-screen manner includes the recorded video and the reference video. Height-width ratios of the recorded videos in different synthesized videos may be different. For example, a height-width ratio of the recorded video having the highest rating of the users is used as the preset height-width ratio. Exemplarily, the preset height-width ratio may be 3:4, 4:5, 1:1, 5:4, 4:3, 5:3 or other height-width ratios.

In an embodiment, the terminal device obtains a statistical parameter for the height-width ratios of the recorded videos by counting the height-width ratios of a large number of the recorded videos, and uses the statistical parameter as the preset height-width ratio. This statistical parameter may be a mean value, a median value or other statistical parameters. In an embodiment, a correlation also exists between the above-mentioned preset height-width ratio and the type of the terminal device. For example, a preset height-width ratio for a mobile phone and a preset height-width ratio for a personal computer are different. Therefore, in an embodiment, a corresponding relation between multiple types of terminal devices and multiple preset height-width ratios is pre-established, and a preset height-width ratio corresponding to the type of a current terminal device is acquired according to the corresponding relation between the multiple types of terminal devices and the multiple preset height-width ratios. For example, if the type of the current terminal device is a mobile phone, the preset height-width ratio may be 4:3, and if the type of the current terminal device is a personal computer, the preset height-width ratio may be 3:4.

In an embodiment, the step in which the corresponding relation between the multiple types of terminal devices and the multiple preset height-width ratios is pre-established may include the following steps: for one type of terminal device in the multiple types of terminal devices, a statistical parameter may be obtained by counting height-width ratios of videos recorded by this type of terminal device; and a preset height-width ratio corresponding to this type of terminal device is determined according to the statistical parameter. Moreover, the preset height-width ratio may also be an empirical value which is obtained by a user or a technician from a lot of practical experience for recording in the split-screen manner.

In an embodiment, the terminal device acquires the first height-width ratio of the picture of the reference video; the terminal device compares the first height-width ratio with the preset height-width ratio to obtain the first comparison result. Exemplarily, if the first height-width ratio is 2:1 and the preset height-width ratio is 3:4, the first comparison result is that the first height-width ratio is greater than the preset height-width ratio; and if the first height-width ratio is 3:4, the preset height-width ratio is 1:1, the first comparison result is that the first height-width ratio is less than the preset height-width ratio. In an embodiment, the step in which the first height-width ratio of the picture of the reference video is acquired includes the following steps: a picture size of the reference video is acquired, where the picture size includes a picture width and a picture height, and a quotient of the picture height and the picture width of the reference video is calculated and used as the first height-width ratio of the picture of the reference video.

In step 204, the picture size of the reference video is adjusted according to a picture size of the recorded video and the first comparison result.

The reference video and the recorded video are two views displayed on a display screen in the split-screen manner. The reference video and the recorded video may be respectively displayed left and right, or may be respectively displayed up and down. In the embodiments of the present disclosure, detailed description is carried out by taking the reference video and the recorded video being displayed left and right as an example. For example, the reference video is displayed on a left side of a current display screen, and the recorded video is displayed on a right side of the current display screen; or the reference video is displayed on the right side of the current display screen, and the recorded video is displayed on the left side of the current display screen. It is understood that a situation that the reference video and the recorded video are displayed up and down and a situation that the reference video and the recorded video are displayed left and right are corresponding, which will not be repeated in the embodiments of the present disclosure. There may be one reference video or multiple reference videos. When there are multiple reference videos, the technical scheme in the case of one reference video may still be adopted to adjust picture sizes of the multiple reference videos, which will not be repeated in the embodiments of the present disclosure.

Figure 3:
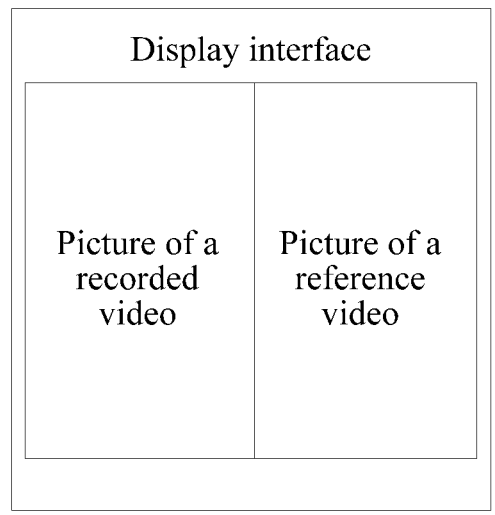
FIG. 3 is a schematic diagram of a display interface of a terminal device according to an embodiment.

As shown in FIG. 3 in conjunction with FIG. 1, when the terminal device 10 performs recording in the split-screen manner, a display interface of the display screen 14 of the terminal device 10 may include a picture of a recorded video and a picture of a reference video. The terminal device 10 may compare a first height-width ratio of the picture of the reference video with a preset height-width ratio to obtain a first comparison result, and adjust a picture size of the reference video according to a picture size of the recorded video and the first comparison result. After receiving a recording instruction, the terminal device 10 shoots the recorded video through the video recording apparatus 15 and displays the shot recorded video on the display screen 14, as shown in the picture of the recorded video in FIG. 3. The terminal device 10 displays the recorded video on the display screen 14 in the split-screen manner while displaying the adjusted reference video on the display screen 14 in the split-screen manner, as shown in the picture of the reference video in FIG. 3. After recording or during recording, the terminal device 10 may perform a synthesized processing on the recorded video and the adjusted reference video to obtain a synthesized video. The terminal device 10 may store the synthesized video in the memory 12, and may share second video data through a communication network. For example, the terminal device 10 uploads the second video data to servers of various video sharing websites or sends the second video data to other terminal devices.

In this embodiment, the terminal device may adjust the picture size of the reference video before recording the recorded video, or may adjust the picture size of the reference video in the process of recording the recorded video.

In an embodiment, the terminal device adjusts the picture size of the reference video according to the picture size of the recorded video and the first comparison result. The picture size of the recorded video is a picture size preset by a user or a default picture size used by the terminal device when recording a video, or may be other picture sizes.

In an embodiment, since the user uses the reference video as a background, reference, or reflection of the recorded video, requirements on the picture integrity and the like of the recorded video are more demanding. Therefore, the coordination and the viewing effect of the whole video picture are improved by adjusting the picture size of the reference video.

In an embodiment, when the first comparison result is that the first height-width ratio is less than the preset height-width ratio, that is, the picture of the reference video is relatively flat compared with a height-width ratio with an optimal human-eye comfort parameter. In order to make viewing more comfortable for human eyes, the picture of the reference video is adjusted according to the picture size of the recorded video and the first comparison result, so that the picture of the reference video is completely presented in an area, except for the picture of the recorded video, in the current display screen, and the picture of the reference video and the picture of the recorded video are visually coordinated. Thus the picture display quality is improved and the user watching comfort level is increased.

In an embodiment, when the first comparison result is that the first height-width ratio is greater than or equal to the preset height-width ratio, that is, the picture of the reference video is relatively thin and long compared with the height-width ratio with the optimal human-eye comfort parameter. In order to make viewing more comfortable for human eyes, the picture of the reference video is adjusted according to the size picture of the recorded video and the first comparison result, so that the picture of the reference video fully fills an area, except for the picture of the recorded video, in the current display screen as much as possible, and the picture of the reference video and the picture of the recorded video are visually coordinated. Thus the picture display quality is improved and the user watching comfort level is increased.

In the above-mentioned video picture adjustment method, the first height-width ratio of the picture of the reference video is compared with the preset height-width ratio to obtain the first comparison result, and the picture size of the reference video is adjusted according to the picture size of the recorded video and the first comparison result. In addition, the human-eye comfort parameter corresponding to the preset height-width ratio is optimal, so that, in the synthesized video adjusted according to the preset height-width ratio, the picture of the recorded video and the picture of the reference video displayed on the display screen in the split-screen manner are visually coordinated. Thus the picture display quality is improved and the user watching comfort level is increased.

Figure 4:
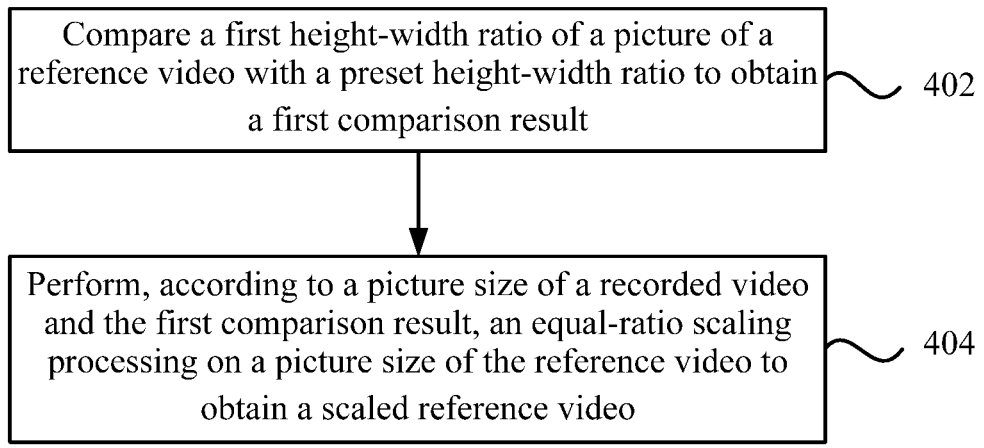
FIG. 4 is a flowchart of a video image adjustment method according to another embodiment.

In an embodiment, as shown in FIG. 4, a video picture adjustment method is provided. The method may include steps described below.

In step 402, a first height-width ratio of a picture of a reference video is compared with a preset height-width ratio to obtain a first comparison result.

A human-eye comfort parameter corresponding to the preset height-width ratio meets a preset condition. The explanation of the step 402 refers to the step 202 described above, which will not be repeated here.

In step 404, an equal-ratio scaling processing is performed on a picture size of the reference video according to a picture size of the recorded video and the first comparison result, to obtain a scaled reference video.

In an embodiment, a picture size of the scaled reference video is matched with the picture size of the recorded video. The equal-ratio scaling processing refers to an overall scaling for the picture of the reference video, and a scaling ratio of a picture height is the same as that of a picture width, so that the reduction of the display quality due to deformation and distortion of the picture of the reference video is avoided.

In an embodiment, the picture size of the scaled reference video being matched with the picture size of the recorded video refers to that the picture size of the scaled reference video is the same as the picture size of the recorded video, or that the picture size of the scaled reference video is approximate to the picture size of the recorded video, or that the picture size of the scaled reference video is the same as or approximate to the picture size of the recorded video in one dimension, where one dimension may be the picture width or the picture height.

Exemplarily, the picture size of the scaled reference video is approximate to the picture size of the recorded video, namely, (1) the picture width in the picture size of the reference video is equal to the picture width in the picture size of the recorded video, and a difference between the picture height in the picture size of the reference video and the picture height in the picture size of the recorded video is less than a preset height threshold value; or (2) the picture height in the picture size of the reference video is equal to the picture height in the picture size of the recorded video, and a difference between the picture width in the picture size of the reference video and the picture width in the picture size of the recorded video is less than a preset width threshold value; or (3) a difference between the picture height in the picture size of the reference video and the picture height in the picture size of the recorded video is less than the preset height threshold value, and a difference between the picture width in the picture size of the reference video and the picture width in the picture size of the recorded video is less than the preset width threshold value. The preset width threshold value may be a percentage of the picture width in the picture size of the recorded video, such as 1%, 2% or 5%.

In an embodiment, the picture size of the scaled reference video being matched with the picture size of the recorded video may be that picture sizes of two views of the reference video and the recorded video displayed on a display screen in a split-screen manner are the same. In addition, the two views fit closely, that is, no reserved area exists at the junction of the two views. Exemplarily, the reserved area may be a black edge.

In an embodiment, the step in which the equal-ratio scaling processing is performed on the picture size of the reference video according to the picture size of the recorded video and the first comparison result, to obtain the scaled reference video may include the following steps: if the first comparison result is that the first height-width ratio is less than the preset height-width ratio, the terminal device performs, according to the picture width in the picture size of the recorded video, the equal-ratio scaling processing on the picture size of the reference video to obtain the scaled reference video.

In an embodiment, a screen width occupied by the scaled reference video on the display screen is equal to a screen width occupied by the recorded video on the display screen. In an embodiment, the step in which the equal-ratio scaling processing is performed on the picture size of the reference video according to the picture width in the picture size of the recorded video may include the following steps: a width ratio of the picture width in the picture size of the reference video to the picture width in the picture size of the recorded video is calculated, and the equal-ratio scaling processing is performed on the picture size of the reference video according to the width ratio.

Figure 5A:
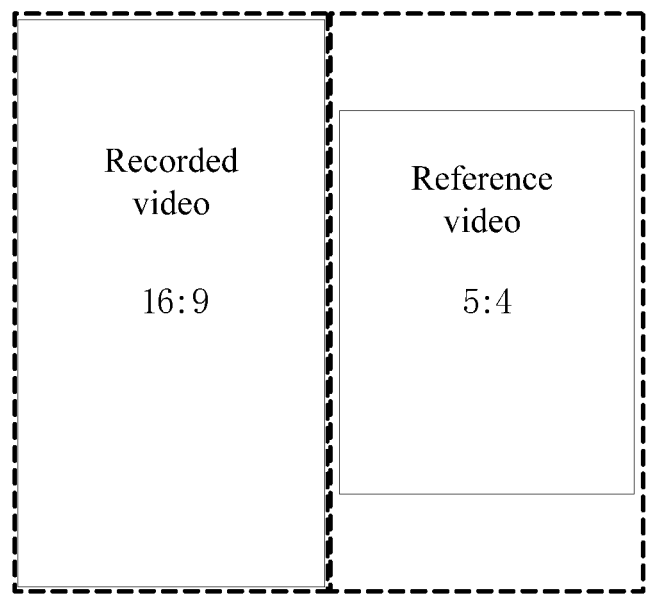
FIG. 5A is a first schematic diagram of a video image adjustment method according to an embodiment.
Figure 5B:
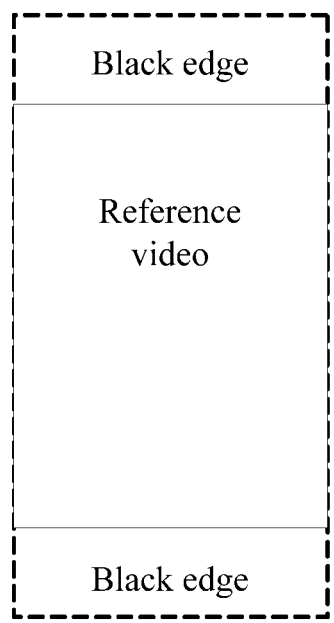
FIG. 5B is a second schematic diagram of a video image adjustment method according to an embodiment.
Figure 5C:
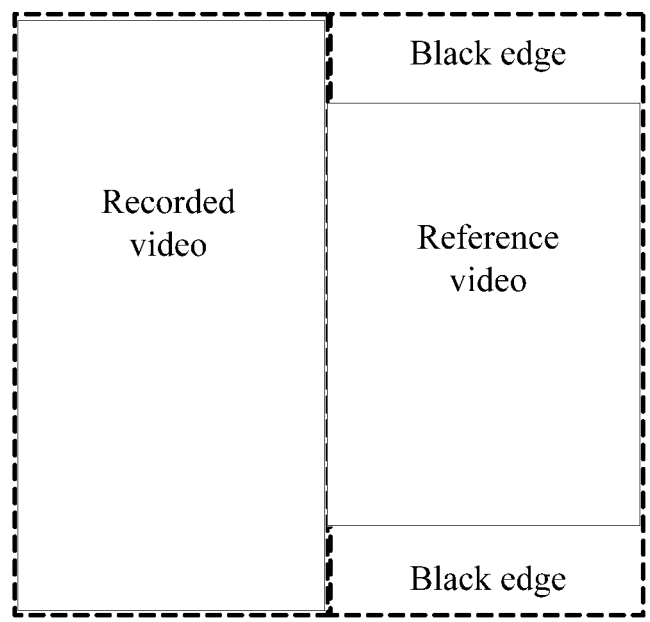
FIG. 5C is a third schematic diagram of a video image adjustment method according to an embodiment.

Exemplarily, referring to FIG. 5A, FIG. 5A shows a schematic diagram of the reference video and the recorded video displayed on the display screen when the first height-width ratio is 5:4, the preset height-width ratio is 4:3, and the second height-width ratio of the picture of the recorded video is 16:9. In this case, the first height-width ratio is less than the preset height-width ratio. Referring to FIG. 5B, FIG. 5B shows a schematic diagram of the scaled reference video after the equal-ratio scaling processing is performed on the picture size of the reference video according to the picture width in the picture size of the recorded video. The screen width occupied by the scaled reference video on the display screen is equal to the screen width occupied by the recorded video on the display screen, and an upper portion and a lower portion of a picture of the scaled reference video include black edges. Referring to FIG. 5C, FIG. 5C shows a schematic diagram of the scaled reference video and the recorded video displayed on the display screen.

Figure 6A:
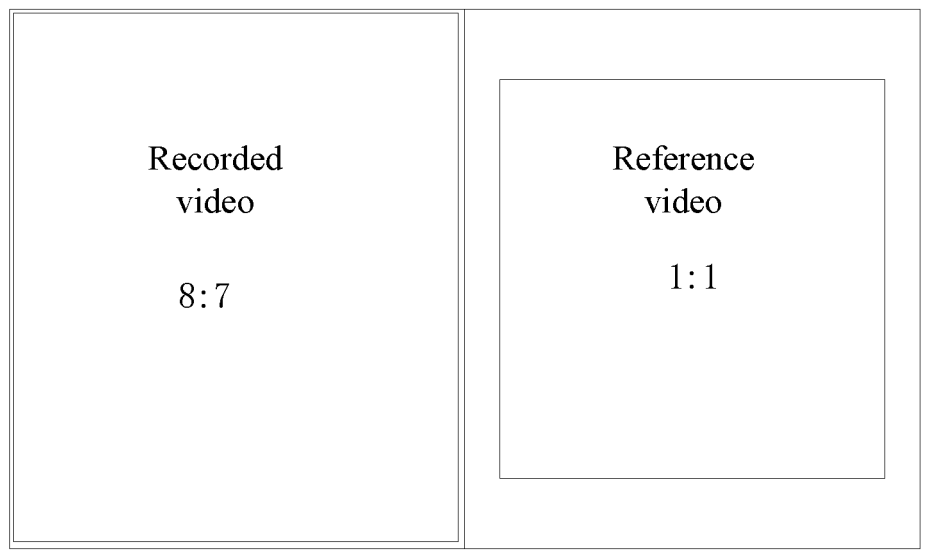
FIG. 6A is a first schematic diagram of a video image adjustment method according to another embodiment.
Figure 6B:
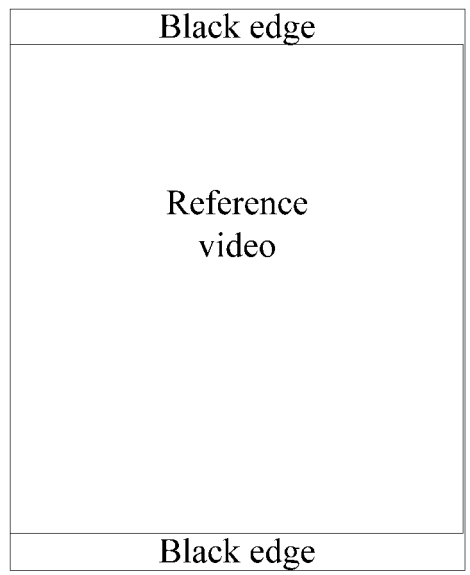
FIG. 6B is a second schematic diagram of a video image adjustment method according to another embodiment.
Figure 6C:
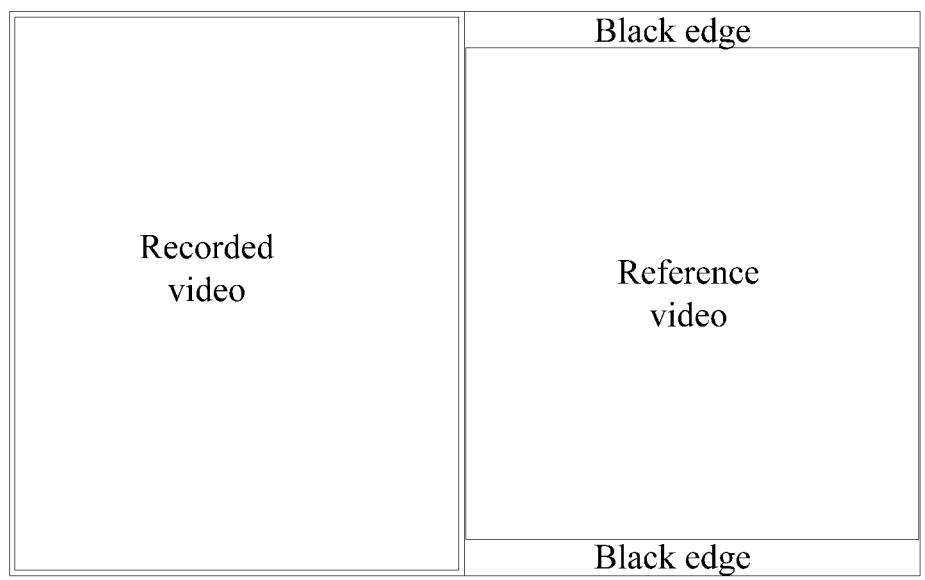
FIG. 6C is a third schematic diagram of a video image adjustment method according to another embodiment.

Exemplarily, referring to FIG. 6A, FIG. 6A shows a schematic diagram of the reference video and the recorded video displayed on the display screen when the first height-width ratio is 1:1, the preset height-width ratio is 4:3, and the second height-width ratio of the picture of the recorded video is 8:7. In this case, the first height-width ratio is less than the preset height-width ratio. Referring to FIG. 6B, FIG. 6B shows a schematic diagram of the scaled reference video after the equal-ratio scaling processing is performed on the picture size of the reference video according to the picture width in the picture size of the recorded video. The screen width occupied by the scaled reference video on the display screen is equal to a screen width occupied by the recorded video on the display screen, and the upper portion and the lower portion of the picture of the scaled reference video include black edges. Referring to FIG. 6C, FIG. 6C shows a schematic diagram of the scaled reference video and the recorded video displayed on the display screen.

In an embodiment, in this embodiment, the upper portion and/or lower portion of the picture of the scaled reference video includes a reserved area. The terminal device may adjust a relative display position of the reference video relative to the recorded video according to a user instruction or a preset instruction, so when the relative display position is above the middle, the upper portion of the picture of the scaled reference video may include the reserved area, and the lower portion of the picture of the scaled reference video may not include the reserved area; when the relative display position is below the middle, the lower portion of the picture of the scaled reference video may include the reserved area, and the upper portion of the picture of the scaled reference video does not include the reserved area; when the relative display position is in the middle, the upper portion of the picture of the scaled reference video may include the reserved area, and the lower portion of the picture of the scaled reference video may also include the reserved area. In an embodiment, after the first height-width ratio of the picture of the reference video is compared with the preset height-width ratio to obtain the first comparison result, the video picture adjustment method may further include the following step: the terminal device compares the second height-width ratio of the picture of the recorded video with the first height-width ratio to obtain a second comparison result. In an embodiment, the step in which "the equal-ratio scaling processing is performed on the picture size of the reference video according to the picture size of the recorded video and the first comparison result, to obtain the scaled reference video" may include the following step: the equal-ratio scaling processing is performed on the picture size of the reference video according to the picture size of the recorded video, the first comparison result and the second comparison result, to obtain the scaled reference video.

In an embodiment, the terminal device acquires the second height-width ratio of the picture size of the recorded video, compares the second height-width ratio with the preset height-width ratio to obtain the second comparison result. Exemplarily, if the second height-width ratio is 1:1, and the preset height-width ratio is 3:4, the second comparison result is that the second height-width ratio is greater than the preset height-width ratio; and if the second height-width ratio is 5:4, and the preset height-width ratio is 4:3, the second comparison result is that the second height-width ratio is less than the preset height-width ratio. In an embodiment, the step in which the second height-width ratio of the picture of the recorded video is acquired includes the following steps: the picture size of the recorded video is acquired, where the picture size includes the picture width and the picture height, and a quotient of the picture height and the picture width of the recorded video is calculated and used as the second height-width ratio of the picture of the recorded video.

In an embodiment, the step in which the equal-ratio scaling processing is performed on the picture size of the reference video according to the picture size of the recorded video, the first comparison result, and the second comparison result, to obtain the scaled reference video may include the following steps: if the first comparison result is that the first height-width ratio is greater than or equal to the preset height-width ratio, and the second comparison result is that the first height-width ratio is greater than the second height-width ratio, the equal-ratio scaling processing is performed on the picture size of the reference video according to the width in the picture size of the recorded video, to obtain the scaled reference video, and the scaled reference video is clipped according to the height in the picture size of the recorded video and a preset clipping rule. The screen width occupied by the scaled reference video on the display screen is equal to the screen width occupied by the recorded video on the display screen. The step in which the scaled reference video is clipped according to the height in the picture size of the recorded video and the preset clipping rule may include the following step: a portion exceeding the height in the picture of the scaled reference video is clipped out according to the height of the picture size of the recorded video. It is understood that, the portion exceeding the height may be clipped from two ends in the height direction in the picture of the reference video, or may be clipped from only one end.

Figure 7A:
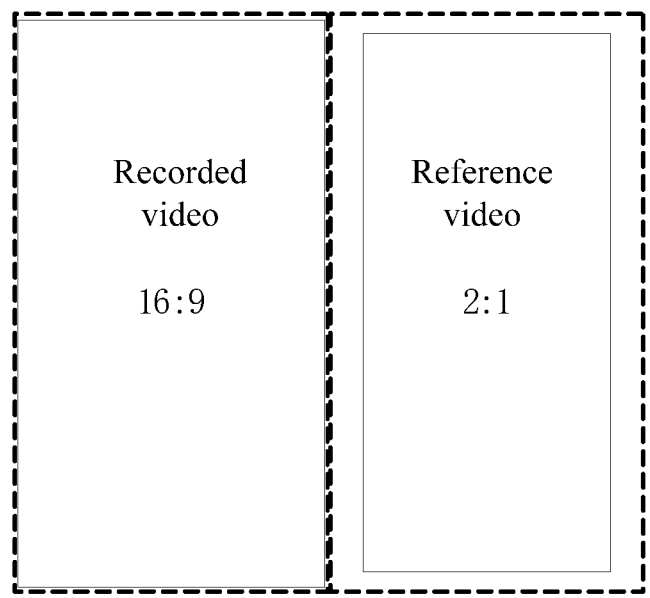
FIG. 7A is a first schematic diagram of a video image adjustment method according to a still another embodiment.
Figure 7B:
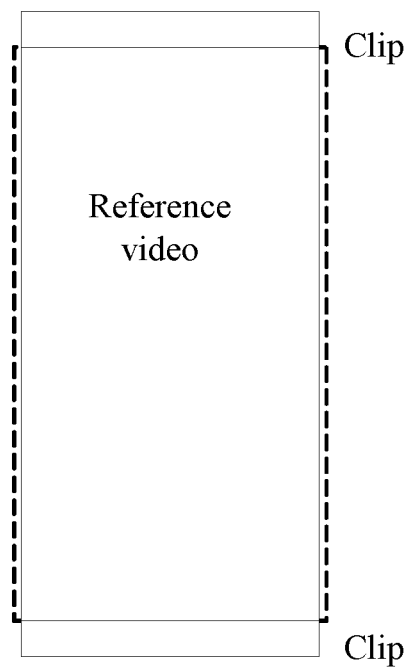
FIG. 7B is a second schematic diagram of a video image adjustment method according to a still another embodiment.
Figure 7C:
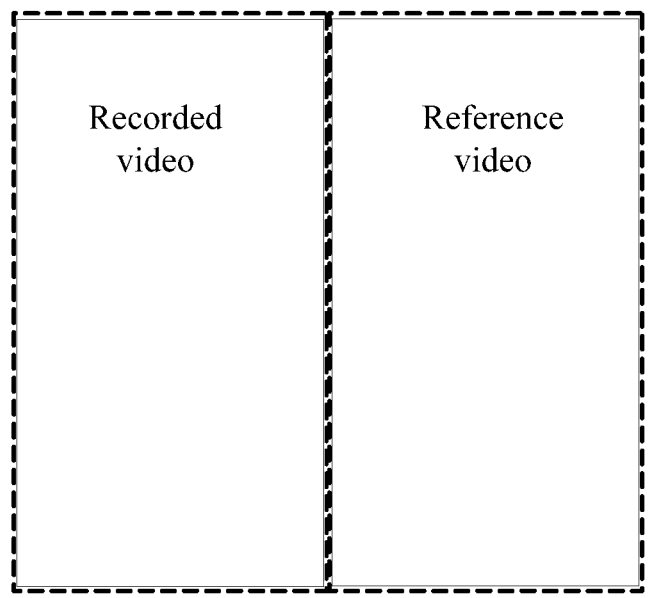
FIG. 7C is a third schematic diagram of a video image adjustment method according to a still another embodiment.

Exemplarily, referring to FIG. 7A, FIG. 7A shows a schematic diagram of the reference video and the recorded video displayed on the display screen when the first height-width ratio is 2:1, the preset height-width ratio is 4:3, and the second height-width ratio of the picture of the recorded video is 16:9. In this case, the first height-width ratio is greater than the preset height-width ratio, and the first height-width ratio is greater than the second height-width ratio. Referring to FIG. 7B, FIG. 7B shows a schematic diagram in which the equal-ratio scaling processing is performed on the picture size of the reference video according to the picture width in the picture size of the recorded video, and the clipping processing is performed on the scaled reference video according to the picture height in the picture size of the recorded video. Referring to FIG. 7C, FIG. 7C shows a schematic diagram of the scaled and clipped reference video and the recorded video displayed on the display screen. A screen size occupied by the scaled and clipped reference video displayed on the display screen is equal to a screen size occupied by the recorded video displayed on the display screen.

Figure 8A:
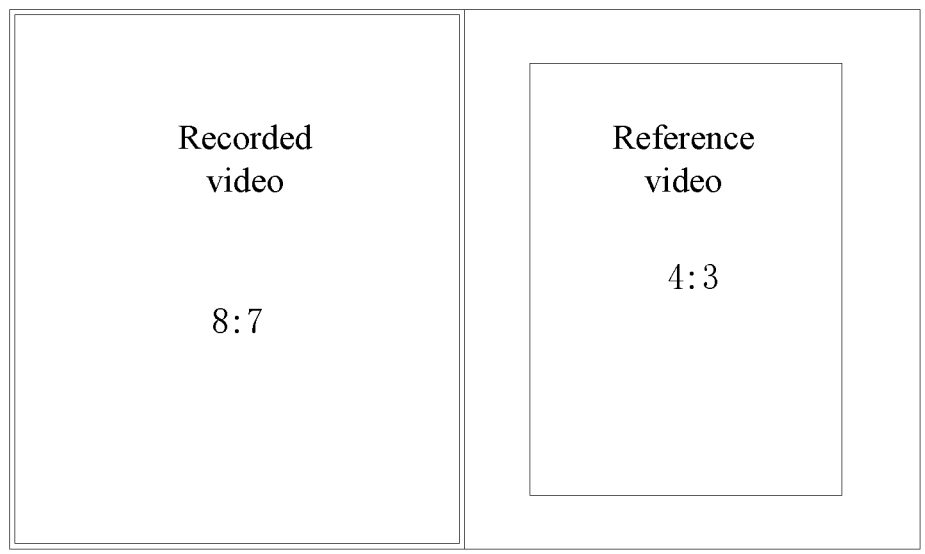
FIG. 8A is a first schematic diagram of a video image adjustment method according to a yet another embodiment.
Figure 8B:
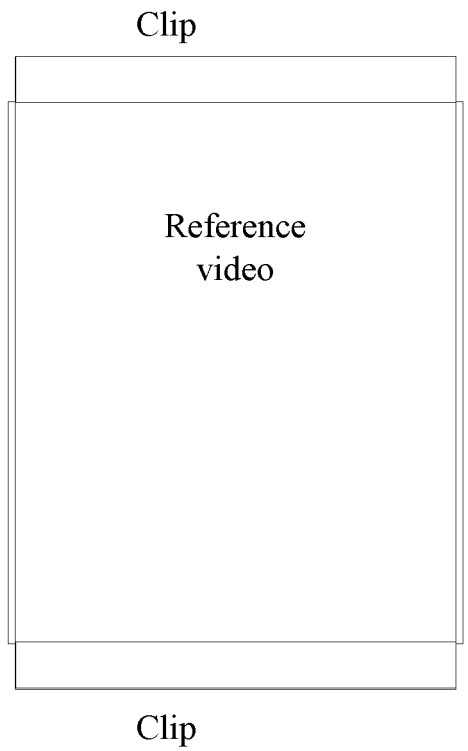
FIG. 8B is a second schematic diagram of a video image adjustment method according to a yet another embodiment.
Figure 8C:
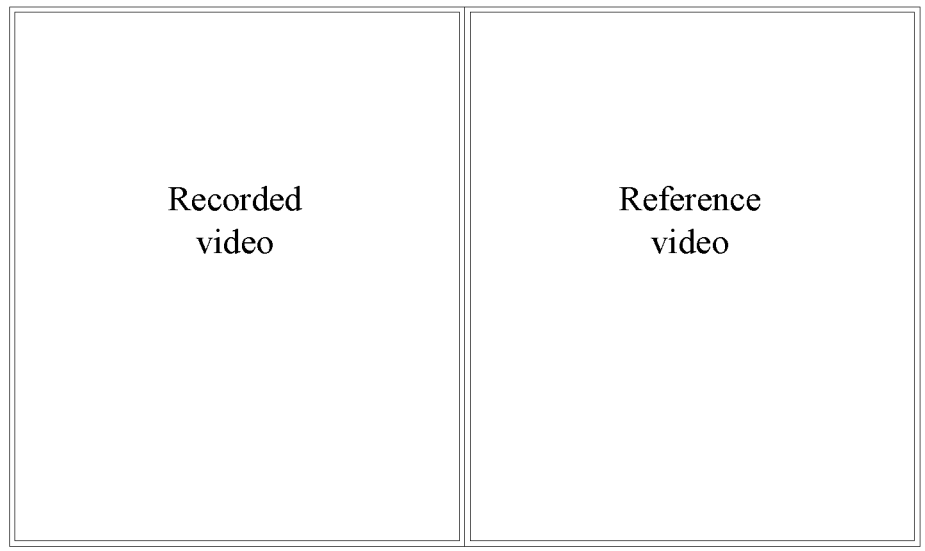
FIG. 8C is a third schematic diagram of a video image adjustment method according to a yet another embodiment.

Exemplarily, referring to FIG. 8A, FIG. 8A shows a schematic diagram of the reference video and the recorded video displayed on the display screen when the first height-width ratio is 4:3, the preset height-width ratio is 4:3, and the second height-width ratio of the picture of the recorded video is 8:7. In this case, the first height-width ratio is equal to the preset height-width ratio, and the first height-width ratio is greater than the second height-width ratio. Referring to FIG. 8B, FIG. 8B shows a schematic diagram in which the equal-ratio scaling processing is performed on the picture size of the reference video according to the picture width in the picture size of the recorded video, and the clipping processing is performed on the scaled reference video according to the picture height in the picture size of the recorded video. Referring to FIG. 8C, FIG. 8C shows a schematic diagram of the scaled and clipped reference video and the recorded video displayed on the display screen. The screen size occupied by the scaled and clipped reference video displayed on the display screen is equal to the screen size occupied by the recorded video displayed on the display screen.

In an embodiment, the step in which the equal-ratio scaling processing is performed on the picture size of the reference video according to the picture size of the recorded video, the first comparison result and the second comparison result, to obtain the scaled reference video may include the following steps: if the first comparison result is that the first height-width ratio is greater than or equal to the preset height-width ratio, and the second comparison result is that the first height-width ratio is less than the second height-width ratio, the equal-ratio scaling processing is performed on the picture size of the reference video according to the height in the picture size of the recorded video, to obtain the scaled reference video, and the scaled reference video is clipped according to the width in the picture size of the recorded video and a preset clipping rule. A screen height occupied by the scaled reference video on the display screen is equal to a screen height occupied by the recorded video on the display screen. The step in which the scaled reference video is clipped according to the width in the picture size of the recorded video and the preset clipping rule may include the following step: a portion exceeding the width in the picture of the scaled reference video is clipped out according to the width in the picture size of the recorded video. It is understood that, the portion exceeding the width may be clipped from two ends in the width direction in the picture of the reference video, or may be clipped from only one end.

In this embodiment, the step in which the equal-ratio scaling processing is performed on the picture size of the reference video according to the height in the picture size of the recorded video may include the following steps: a height ratio of the picture height in the picture size of the reference video to the picture height in the picture size of the recorded video is calculated, and the equal-ratio scaling processing is performed on the picture size of the reference video according to the height ratio.

Figure 9A:
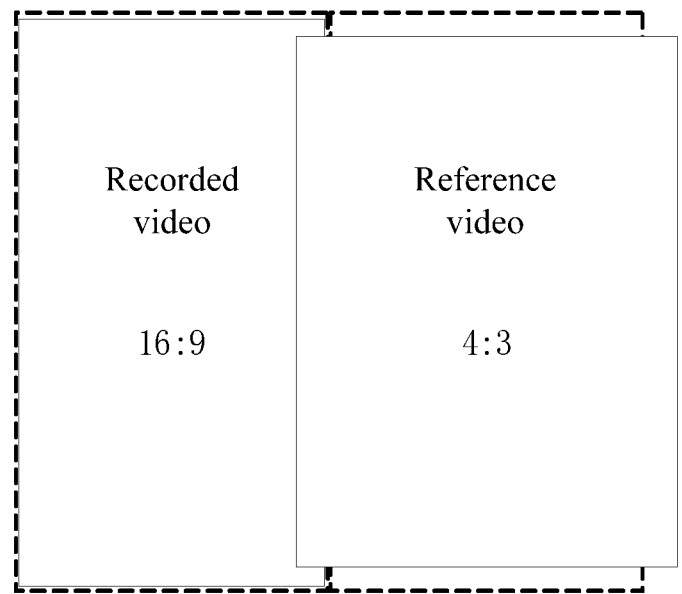
FIG. 9A is a first schematic diagram of a video image adjustment method according to a still another embodiment.
Figure 9B:
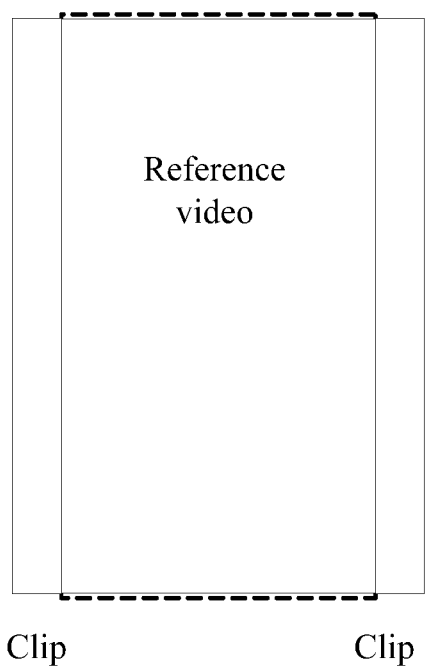
FIG. 9B is a second schematic diagram of a video image adjustment method according to a still another embodiment.
Figure 9C:
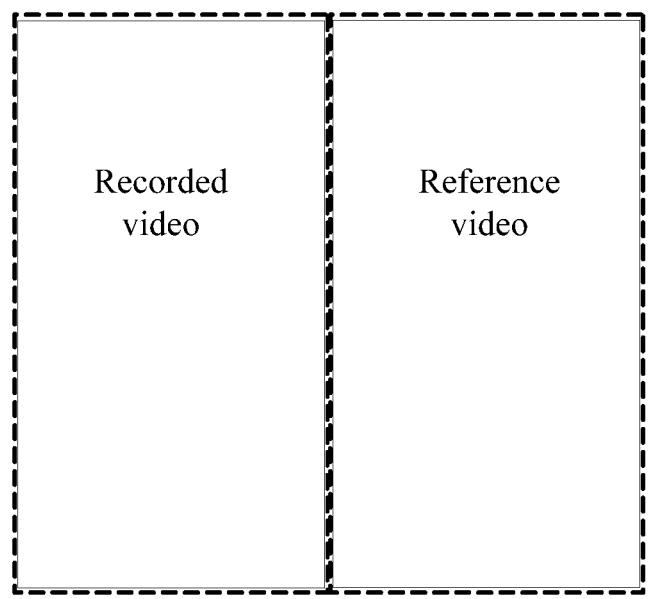
FIG. 9C is a third schematic diagram of a video image adjustment method according to a still another embodiment.

Exemplarily, referring to FIG. 9A, FIG. 9A shows a schematic diagram of the reference video and the recorded video displayed on the display screen when the first height-width ratio is 4:3, the preset height-width ratio is 4:3, and the second height-width ratio of the picture of the recorded video is 16:9. In this case, the first height-width ratio is equal to the preset height-width ratio, and the first height-width ratio is less than the second height-width ratio. Referring to FIG. 9B, FIG. 9B shows a schematic diagram in which the equal-ratio scaling processing is performed on the picture size of the reference video according to the picture height in the picture size of the recorded video, and the clipping processing is performed on the scaled reference video according to the picture width in the picture size of the recorded video. Referring to FIG. 9C, FIG. 9C shows a schematic diagram of the scaled and clipped reference video and the recorded video displayed on the display screen. The screen size occupied by the scaled and clipped reference video displayed on the display screen is equal to the screen size occupied by the recorded video displayed on the display screen.

In an embodiment, the step in which the equal-ratio scaling processing is performed on the picture size of the reference video according to the picture size of the recorded video, the first comparison result and the second comparison result, to obtain the scaled reference video may include the following steps: if the first comparison result is that the first height-width ratio is greater than or equal to the preset height-width ratio, and the second comparison result is that the first height-width ratio is equal to the second height-width ratio, the equal-ratio scaling processing is performed on the picture size of the reference video according to the width or height in the picture size of the recorded video, to obtain the scaled reference video. The screen size occupied by the scaled reference video on the display screen is equal to the screen size occupied by the recorded video on the display screen.

In an embodiment, the preset clipping rule includes a uniform clipping rule, an alignment clipping rule, an identifying person clipping rule or a clipping rule generated according to a user instruction. For example, a target area of the picture of the scaled reference video may be identified through the picture size of the recorded video and/or a preset image identification technology, and then the target area is clipped according to the clipping rule. The uniform clipping rule may be to acquire a position coordinate of the target area and perform an equal-ratio clipping on areas at an upper position, a lower position, a left position and a right position of the target area. The left-right alignment clipping rule may be to align the target area with left or right and clip out excess areas. The identifying person clipping rule may be to identify key point coordinates of a target person and clip other areas except for the key points of the target person. The clipping rule generated according to the user instruction may be to select a clipping rule corresponding to the instruction for clipping according to the user instruction in real time, for example, the uniform clipping rule may be selected when the user instruction is a first instruction.

In the above-mentioned video picture adjustment method, the first height-width ratio of the picture of the reference video is compared with the preset height-width ratio to obtain the first comparison result, and the equal-ratio scaling processing is performed on the picture size of the reference video according to the picture size of the recorded video and the first comparison result, to obtain the scaled reference video, so that the picture size of the scaled reference video is matched with the picture size of the recorded video. In addition, since the human-eye comfort parameter corresponding to the preset height-width ratio is optimal, the picture of the recorded video and the picture of the reference video displayed on the display screen in the split-screen manner are visually coordinated. Thus the picture display quality is improved and the user watching comfort level is increase. Meanwhile, the reduction of the display quality due to deformation and distortion of the picture of the reference video in the adjustment process is avoided.

In an embodiment, the video picture adjustment method may further include the following step: the adjusted reference video and the recorded video are synthesized into a target video in a process of recording the recorded video. That is, in the process of recording the recorded video, video frames of the adjusted reference video and recorded video frames of the recorded video are synthesized to generate video frames of the target video. It is understood that a set of video frames of the reference video and the recorded video which are synthesized have the same timestamps when played on the current display screen. In this embodiment, since the recorded video and the reference video are synthesized in the recording process, the efficiency is increased compared with that the recorded video and the reference video are synthesized after the recording process.

It should be understood that although multiple steps in the flowcharts of FIG. 2 and FIG. 4 are shown sequentially as indicated by the arrows, these steps are not necessarily executed sequentially as indicated by the arrows. The performance of these steps is not strictly limited in an order, and these steps may be executed in other orders, unless explicitly stated herein. Moreover, at least part of the steps in FIG. 2 and FIG. 4 may include multiple sub-steps or multiple stages. These sub-steps or stages are not necessarily executed at the same time, but may be executed at different times. These sub-steps or stages are not necessarily executed sequentially, but may be executed in turn or alternately with other steps or at least part of sub-steps or stages of other steps.

Figure 10:
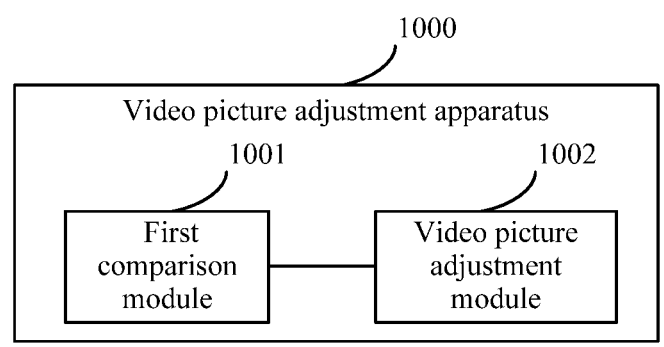
FIG. 10 is a block diagram of a structure of a video picture adjustment apparatus according to an embodiment.

In an embodiment, as shown in FIG. 10, a video picture adjustment apparatus 1000 is provided. The video picture adjustment apparatus 1000 may include a first comparison module 1001 and a video picture adjustment module 1002.

The first comparison module 1001 is configured to compare a first height-width ratio of a picture of a reference video with a preset height-width ratio to obtain a first comparison result. A human-eye comfort parameter corresponding to the preset height-width ratio meets a preset condition.

The video picture adjustment module 1002 is configured to adjust a picture size of the reference video according to a picture size of a recorded video and the first comparison result. The reference video and the recorded video are two views displayed on a display screen in a split-screen manner.

Figure 11:
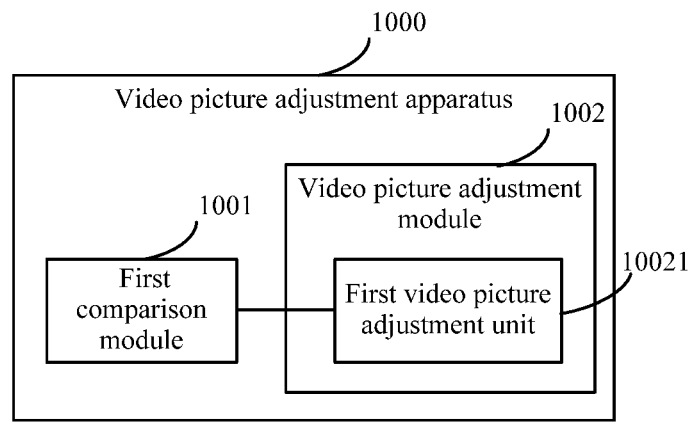
FIG. 11 is a block diagram of a structure of a video picture adjustment apparatus according to another embodiment.

In an embodiment, as shown in FIG. 11, the video picture adjustment module 1002 may include a first video picture adjustment unit 10021. The first video picture adjustment unit 10021 is configured to perform, according to the picture size of the recorded video and the first comparison result, an equal-ratio scaling processing on the picture size of the reference video to obtain a scaled reference video. In an embodiment, a picture size of the scaled reference video is matched with the picture size of the recorded video.

In an embodiment, the first video picture adjustment unit 10021 is configured to, if the first comparison result is that the first height-width ratio is less than the preset height-width ratio, perform, according to a picture width in the picture size of the recorded video, the equal-ratio scaling processing on the picture size of the reference video to obtain a scaled reference video. A screen width occupied by the scaled reference video on the display screen is equal to a screen width occupied by the recorded video on the display screen.

In an embodiment, an upper portion and/or a lower portion of the picture of the scaled reference video include a reserved area.

Figure 12:
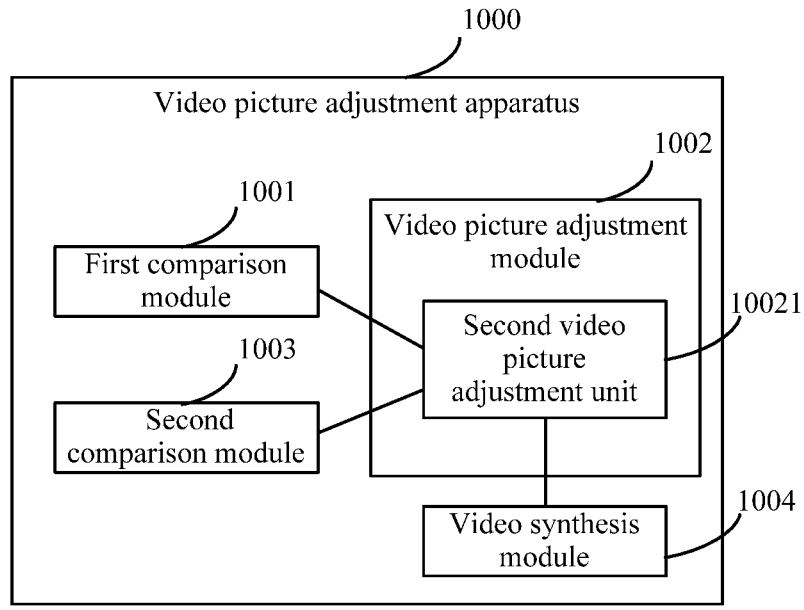
FIG. 12 is a block diagram of a structure of a video picture adjustment apparatus according to yet another embodiment.

In an embodiment, as shown in FIG. 12, the video picture adjustment apparatus 1000 may further include a second comparison module 1003. The second comparison module 1003 is configured to compare a second height-width ratio of the picture of the recorded video with the first height-width ratio to obtain a second comparison result. In this embodiment, the video picture adjustment module 1002 may include a second video picture adjustment unit 10022. The second video picture adjustment unit 10022 is configured to perform, according to the picture size of the recorded video, the first comparison result and the second comparison result, the equal-ratio scaling processing on the picture size of the reference video to obtain the scaled reference video.

In an embodiment, the second video picture adjustment unit 10022 is configured to, if the first comparison result is that the first height-width ratio is greater than or equal to the preset height-width ratio, and the second comparison result is that the first height-width ratio is greater than the second height-width ratio, perform, according to the width in the picture size of the recorded video, the equal-ratio scaling processing on the picture size of the reference video to obtain the scaled reference video, and clip the scaled reference video according to the height in the picture size of the recorded video and a preset clipping rule. A screen width occupied by the scaled reference video on the display screen is equal to a screen width occupied by the recorded video on the display screen.

In an embodiment, the second video picture adjustment unit 10022 is configured to, if the first comparison result is that the first height-width ratio is greater than or equal to the preset height-width ratio, and the second comparison result is that the first height-width ratio is less than the second height-width ratio, perform, according to the height in the picture size of the recorded video, the equal-ratio scaling processing on the picture size of the reference video to obtain the scaled reference video, and clip the scaled reference video according to the width in the picture size of the recorded video and the preset clipping rule. A screen height occupied by the scaled reference video displayed on the display screen is equal to a screen height occupied by the recorded video displayed on the display screen.

In an embodiment, the preset clipping rule includes a uniform clipping rule, an alignment clipping rule, an identifying person clipping rule or a clipping rule generated according to a user instruction.

In an embodiment, the video picture adjustment apparatus 1000 may further include a device type acquisition module and a preset height-width ratio acquisition module. The device type acquisition module is configured to acquire a type of a current terminal device. The preset height-width ratio acquisition module is configured to acquire a preset height-width ratio corresponding to the type of the current terminal device according to a pre-established corresponding relation between multiple types of terminal devices and multiple preset height-width ratios.

In an embodiment, as shown in FIG. 12, the video picture adjustment apparatus 1000 may further include a video synthesis module 1004. The video synthesis module 1004 is configured to synthesize the adjusted reference video and the recorded video into a target video in a process of recording the recorded video.

In the above-mentioned video picture adjustment apparatus, the first height-width ratio of the picture of the reference video is compared with the preset height-width ratio to obtain the first comparison result, and the picture size of the reference video is adjusted according to the picture size of the recorded video and the first comparison result. In addition, since the human-eye comfort parameter corresponding to the preset height-width ratio is optimal, the picture of the recorded video and the picture of the reference video displayed on the display screen in the split-screen manner are visually coordinated. Thus the picture display quality is improved and the user watching comfort level is increased.

Specific definitions regarding to the video picture adjustment apparatus may refer to the definitions of the video picture adjustment method described above, which will not repeated here. All or part of the multiple modules in the above-mentioned video picture adjustment apparatus may be implemented through software, hardware and a combination thereof. The above-mentioned multiple modules may be embedded in or independent of a processor in a computer device in the form of hardware, or may be stored in a memory in the computer device in the form of software, so that the processor may call and execute operations corresponding to the above-mentioned multiple modules.

Figure 13:
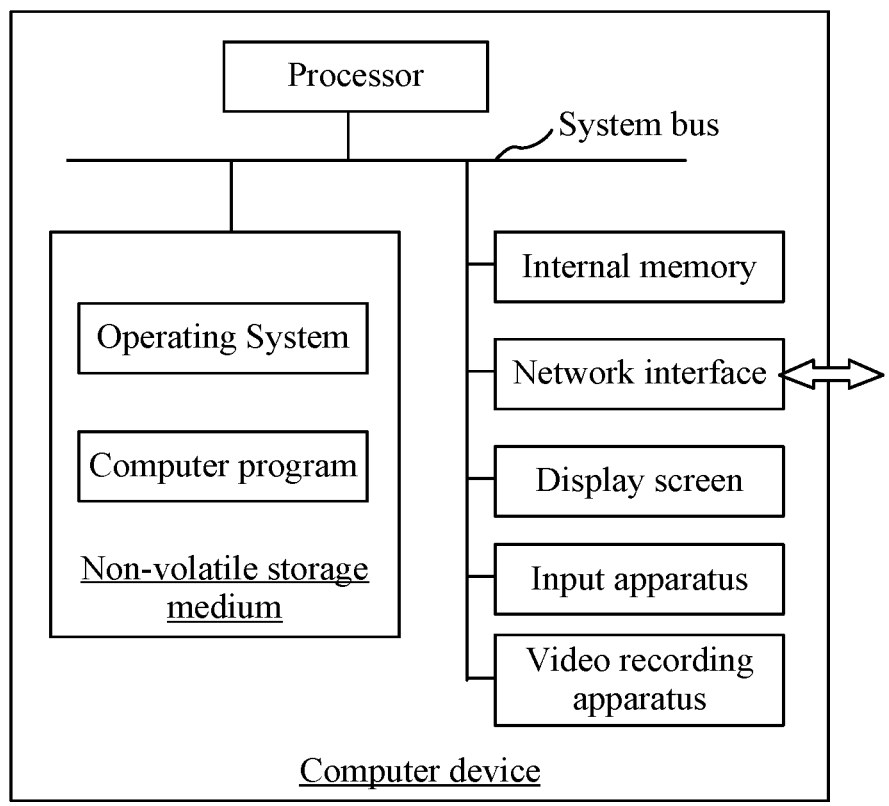
FIG. 13 is a diagram of an internal structure of a computer device according to an embodiment.

In an embodiment, a computer device is provided. The computer device may be a terminal, and an internal structure thereof may be as shown in FIG. 13. The computer device includes a processor, a memory, a network interface, a display screen, an input apparatus and a video recording apparatus which are connected via a system bus. The processor of the computer device is configured to provide computing and control capabilities. The memory of the computer device includes a non-volatile storage medium and an internal memory. The non-volatile storage medium stores an operating system and computer programs. The internal memory provides an environment for the running of the operating system and the computer programs in the non-volatile storage medium. The network interface of the computer device is configured to communicate with an external terminal through a network connection. The computer programs, when executed by the processor, implement the video image adjustment method described in any embodiment of the present disclosure. The display screen of the computer device may be a liquid crystal display screen or an electronic ink display screen. The input apparatus of the computer device may be a touch layer covered on the display screen, or may be a button, a trackball or a touch pad provided on a housing of the computer device, or may be an external keyboard, a touch pad or a mouse and the like. The video recording apparatus of the computer device may be a camera and is configured to record a video.

Those skilled in the art may understand that the structure shown in FIG. 13 is merely a block diagram of a part of the structures related to the scheme of the present disclosure, and does not constitute a limitation on the above-mentioned computer device to which the scheme of the present disclosure is applied, and that an actual computer device may include more or less components than those shown in the drawings, or may include a combination of some components, or have different component arrangements.

In an embodiment, a computer device is provided. The computer device includes a memory and a processor. The memory stores computer programs. The processor, when executing the computer programs, implements the following steps: a first height-width ratio of a picture of a reference video is compared with a preset height-width ratio to obtain a first comparison result, where a human-eye comfort parameter corresponding to the preset height-width ratio meets a preset condition; and a picture size of the reference video is adjusted according to a picture size of the recorded video and the first comparison result. The reference video and the recorded video are two views displayed on a display screen in a split-screen manner.

In an embodiment, the processor, when executing the computer programs, further implements the following step: an equal-ratio scaling processing is performed on the picture size of the reference video according to the picture size of the recorded video and the first comparison result, to obtain a scaled reference video. In an embodiment, a picture size of the scaled reference video is matched with the picture size of the recorded video.

In an embodiment, the processor, when executing the computer programs, further implements the following steps: if the first comparison result is that the first height-width ratio is less than the preset height-width ratio, the equal-ratio scaling processing is performed on the picture size of the reference video according to a picture width in the picture size of the recorded video, to obtain a scaled reference video. A screen width occupied by the scaled reference video on the display screen is equal to a screen width occupied by the recorded video on the display screen.

In an embodiment, an upper portion and/or a lower portion of the picture of the scaled reference video includes a reserved area.

In an embodiment, the processor, when executing the computer programs, further implements the following steps: a second height-width ratio of a picture of the recorded video is compared with the first height-width ratio to obtain a second comparison result; and the equal-ratio scaling processing is performed on the picture size of the reference video according to the picture size of the recorded video, the first comparison result and the second comparison result, to obtain the scaled reference video.

In an embodiment, the processor, when executing the computer programs, further implements the following steps: if the first comparison result is that the first height-width ratio is greater than or equal to the preset height-width ratio, and the second comparison result is that the first height-width ratio is greater than the second height-width ratio, the equal-ratio scaling processing is performed on the picture size of the reference video according to the width in the picture size of the recorded video, to obtain the scaled reference video, and the scaled reference video is clipped according to the height in the picture size of the recorded video and a preset clipping rule. The screen width occupied by the scaled reference video on the display screen is equal to the screen width occupied by the recorded video on the display screen.

In an embodiment, the processor, when executing the computer programs, further implements the following steps: if the first comparison result is that the first height-width ratio is greater than or equal to the preset height-width ratio, and the second comparison result is that the first height-width ratio is less than the second height-width ratio, the equal-ratio scaling processing is performed on the picture size of the reference video according to the height in the picture size of the recorded video, to obtain the scaled reference video, and the scaled reference video is clipped according to the width in the picture size of the recorded video and the preset clipping rule. A screen height occupied by the scaled reference video on the display screen is equal to a screen height occupied by the recorded video on the display screen.

In an embodiment, the preset clipping rule includes a uniform clipping rule, an alignment clipping rule, an identifying person clipping rule or a clipping rule generated according to a user instruction.

In an embodiment, the processor, when executing the computer programs, further implements the following step: a type of a current terminal device is acquired; and a preset height-width ratio corresponding to the type of the current terminal device is acquired according to a pre-established corresponding relation between multiple types of terminal devices and multiple preset height-width ratios.

In an embodiment, the processor, when executing the computer programs, further implements the following step: the adjusted reference video and the recorded video are synthesized into a target video in a process of recording the recorded video.

In an embodiment, a computer-readable storage medium is provided. Computer programs are stored on the computer-readable storage medium. The computer programs, when executed by a processor, implement the following steps: a first height-width ratio of a picture of a reference video is compared with a preset height-width ratio to obtain a first comparison result, where a human-eye comfort parameter corresponding to the preset height-width ratio meets a preset condition; and a picture size of the reference video is adjusted according to a picture size of the recorded video and the first comparison result. The reference video and the recorded video are two views displayed on a display screen in a split-screen manner.

In an embodiment, the computer programs, when executed by the processor, further implement the following step: an equal-ratio scaling processing is performed on the picture size of the reference video according to the picture size of the recorded video and the first comparison result, to obtain a scaled reference video. In an embodiment, a picture size of the scaled reference video is matched with the picture size of the recorded video.

In an embodiment, the computer programs, when executed by the processor, further implement the following steps: if the first comparison result is that the first height-width ratio is less than the preset height-width ratio, the equal-ratio scaling processing is performed on the picture size of the reference video according to a picture width in the picture size of the recorded video, to obtain the scaled reference video. A screen width occupied by the scaled reference video on the display screen is equal to a screen width occupied by the recorded video on the display screen.

In an embodiment, an upper portion and/or a lower portion of the picture of the scaled reference video includes a reserved area.

In an embodiment, the computer programs, when executed by the processor, further implement the following steps: a second height-width ratio of a picture of the recorded video is compared with the first height-width ratio to obtain a second comparison result; and the equal-ratio scaling processing is performed on the picture size of the reference video according to the picture size of the recorded video, the first comparison result and the second comparison result, to obtain the scaled reference video.

In an embodiment, the computer programs, when executed by the processor, further implement the following steps: if the first comparison result is that the first height-width ratio is greater than or equal to the preset height-width ratio, and the second comparison result is that the first height-width ratio is greater than the second height-width ratio, the equal-ratio scaling processing is performed on the picture size of the reference video according to the width in the picture size of the recorded video, to obtain the scaled reference video, and the scaled reference video is clipped according to the height in the picture size of the recorded video and a preset clipping rule. The screen width occupied by the scaled reference video on the display screen is equal to the screen width occupied by the recorded video on the display screen.

In an embodiment, the computer programs, when executed by the processor, further implement the following steps: if the first comparison result is that the first height-width ratio is greater than or equal to the preset height-width ratio, and the second comparison result is that the first height-width ratio is less than the second height-width ratio, the equal-ratio scaling processing is performed on the picture size of the reference video according to the height in the picture size of the recorded video, to obtain the scaled reference video, and the scaled reference video is clipped according to the width in the picture size of the recorded video and the preset clipping rule. A screen height occupied by the scaled reference video on the display screen is equal to a screen height occupied by the recorded video on the display screen.

In an embodiment, the preset clipping rule includes a uniform clipping rule, an alignment clipping rule, an identifying person clipping rule or a clipping rule generated according to a user instruction.

In an embodiment, the computer programs, when executed by the processor, further implement the following steps: a type of a current terminal device is acquired; and a preset height-width ratio corresponding to the type of the current terminal device is acquired according to a pre-established corresponding relation between multiple types of terminal devices and multiple preset height-width ratios.

In an embodiment, the computer programs, when executed by the processor, further implement the following step: the adjusted reference video and the recorded video are synthesized into a target video in a process of recording the recorded video.

Those of ordinary skill in the art may understand that all or part of the procedures in the methods of the above embodiments may be implemented by instructing relevant hardware through computer programs. The computer programs may be stored in a non-volatile computer-readable storage medium. The computer programs, when executed, may include procedures of the embodiments of the methods as described above. Any references to memory, storage, database or other media used in the embodiments provided by the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache memory. As an illustration rather than a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a direct Rambus RAM (RDRAM), a direct Rambus dynamic RAM (DRDRAM) and a Rambus dynamic RAM (RDRAM).

What is claimed is:

1. A video picture adjustment method, comprising:
    comparing a first height-width ratio of a picture of a reference video with a preset height-width ratio to obtain a first comparison result, wherein the reference video is pre-stored in a terminal, and a human-eye comfort parameter corresponding to the preset height-width ratio is optimal;
    before recording a recorded video or during recording a recorded video, adjusting a picture size of the reference video according to a picture size of the recorded video and the first comparison result to match the adjusted picture size of the reference video with the picture size of the recorded video, wherein the recorded video started recording after the reference video is displayed on a current display screen and the reference video and the recorded video are two views displayed in a split-screen manner, and wherein the reference video and the recorded video fit closely and no reserved area exists at a junction of the reference video and the recorded video; and
    during recording the recorded video or after recording the recorded video, synthesizing the adjusted reference video and the recorded video into a target videos, wherein the adjusted reference video is used as a background, reference, or reflection of the recorded video to be synthesized with the recorded video.

2. The method of claim 1, wherein adjusting the picture size of the reference video according to the picture size of the recorded video and the first comparison result comprises:
    performing, according to the picture size of the recorded video and the first comparison result, an equal-ratio scaling processing on the picture size of the reference video to obtain a scaled reference video, wherein a picture size of the scaled reference video is matched with the picture size of the recorded video.

3. The method of claim 2, wherein performing, according to the picture size of the recorded video and the first comparison result, the equal-ratio scaling processing on the picture size of the reference video to obtain the scaled reference video comprises:
    in response to determining that the first comparison result is that the first height-width ratio is less than the preset height-width ratio, performing, according to a picture width in the picture size of the recorded video, the equal-ratio scaling processing on the picture size of the reference video to obtain the scaled reference video, wherein a screen width occupied by the scaled reference video on the current display screen is equal to a screen width occupied by the recorded video on the current display screen.

4. The method of claim 3, wherein at least one of an upper portion or a lower portion of a picture of the scaled reference video comprises a reserved area.

5. The method of claim 2, wherein after comparing the first height-width ratio of the picture of the reference video with the preset height-width ratio to obtain the first comparison result, the method further comprises:
    comparing a second height-width ratio of a picture of the recorded video with the first height-width ratio to obtain a second comparison result; and
    wherein performing, according to the picture size of the recorded video and the first comparison result, the equal-ratio scaling processing on the picture size of the reference video to obtain the scaled reference video comprises:
    performing, according to the picture size of the recorded video, the first comparison result and the second comparison result, the equal-ratio scaling processing on the picture size of the reference video to obtain the scaled reference video.

6. The method of claim 5, wherein performing, according to the picture size of the recorded video, the first comparison result and the second comparison result, the equal-ratio scaling processing on the picture size of the reference video to obtain the scaled reference video comprises:

in response to determining that the first comparison result is that the first height-width ratio is greater than or equal to the preset height-width ratio, and the second comparison result is that the first height-width ratio is greater than the second height-width ratio, performing, according to a width in the picture size of the recorded video, the equal-ratio scaling processing on the picture size of the reference video to obtain the scaled reference video, and clipping the scaled reference video according to a height in the picture size of the recorded video and a preset clipping rule, wherein a screen width occupied by the scaled reference video on the current display screen is equal to a screen width occupied by the recorded video on the current display screen.

7. The method of claim 5, wherein performing, according to the picture size of the recorded video, the first comparison result and the second comparison result, the equal-ratio scaling processing on the picture size of the reference video to obtain the scaled reference video comprises:
in response to determining that the first comparison result is that the first height-width ratio is greater than or equal to the preset height-width ratio, and the second comparison result is that the first height-width ratio is less than the second height-width ratio, performing, according to a height in the picture size of the recorded video, the equal-ratio scaling processing on the picture size of the reference video to obtain the scaled reference video, and clipping the scaled reference video according to a width in the picture size of the recorded video and a preset clipping rule, wherein a screen height occupied by the scaled reference video on the current display screen is equal to a screen height occupied by the recorded video on the current display screen.

8. The method of claim 6, wherein the preset clipping rule comprises a uniform clipping rule, an alignment clipping rule, an identifying person clipping rule or a clipping rule generated according to a user instruction.

9. The method of claim 7, wherein the preset clipping rule comprises a uniform clipping rule, an alignment clipping rule, an identifying person clipping rule or a clipping rule generated according to a user instruction.

10. The method of claim 1, wherein before comparing the first height-width ratio of the picture of the reference video with the preset height-width ratio to obtain the first comparison result, the method further comprises:
acquiring a type of a current terminal device; and
acquiring a preset height-width ratio corresponding to the type of the current terminal device according to a pre-established corresponding relation between types of terminal devices and preset height-width ratios.

11. A computer device, comprising a memory and a processor, wherein the memory stores a computer program, and the computer program, when executed by the processor, implements:
comparing a first height-width ratio of a picture of a reference video with a preset height-width ratio to obtain a first comparison result, wherein the reference video is pre-stored in a terminal, and a human-eye comfort parameter corresponding to the preset height-width ratio is optimal;
before recording a recorded video or during recording a recoded video, adjusting a picture size of the reference video according to a picture size of the recorded video and the first comparison result to match the adjusted picture size of the reference video with the picture size of the recorded video, wherein the recorded video started recording after the reference video is displayed on a current display screen and the reference video and the recorded video are two views displayed in a split-screen manner, and wherein the reference video and the recorded video fit closely and no reserved area exists at a junction of the reference video and the recorded video; and
during recording the recorded video or after recording the recorded video, synthesizing the adjusted reference video and the recorded video into a target video, wherein the adjusted reference video is used as a background, reference, or reflection of the recorded video to be synthesized with the recorded video.

12. The computer device of claim 11, wherein the computer program, when executed by the processor, implements:
performing, according to the picture size of the recorded video and the first comparison result, an equal-ratio scaling processing on the picture size of the reference video to obtain a scaled reference video, wherein a picture size of the scaled reference video is matched with the picture size of the recorded video.

13. The computer device of claim 12, wherein the computer program, when executed by the processor, implements:
in response to determining that the first comparison result is that the first height-width ratio is less than the preset height-width ratio, performing, according to a picture width in the picture size of the recorded video, the equal-ratio scaling processing on the picture size of the reference video to obtain the scaled reference video, wherein a screen width occupied by the scaled reference video on the current display screen is equal to a screen width occupied by the recorded video on the current display screen.

14. The computer device of claim 13, wherein at least one of an upper portion or a lower portion of a picture of the scaled reference video comprises a reserved area.

15. The computer device of claim 12, wherein the computer program, when executed by the processor, implements:
comparing a second height-width ratio of a picture of the recorded video with the first height-width ratio to obtain a second comparison result; and
performing, according to the picture size of the recorded video, the first comparison result and the second comparison result, the equal-ratio scaling processing on the picture size of the reference video to obtain the scaled reference video.

16. A non-volatile computer-readable storage medium, storing a computer program, wherein the computer program, when executed by a processor, implements:
comparing a first height-width ratio of a picture of a reference video with a preset height-width ratio to obtain a first comparison result, wherein the reference video is pre-stored in a terminal, and a human-eye comfort parameter corresponding to the preset height-width ratio is optimal;
before recording a recorded video or during recording a recorded video, adjusting a picture size of the reference video according to a picture size of the recorded video and the first comparison result to match the adjusted picture size of the reference video with the picture size of the recorded video, wherein the recorded video started recording after the reference video is displayed on a current display screen and the reference video and the recorded video are two views displayed in a split-screen manner, and wherein the reference video and the recorded video fit closely and no reserved area exists at a junction of the reference video and the recorded video; and during recording the recorded video or after recording the recorded video, synthesizing the adjusted reference video and the recorded video into a target video, wherein the adjusted reference video is used as a background, reference, or reflection of the recorded video to be synthesized with the recorded video.

* * * * *